United States Patent
Forr et al.

(10) Patent No.: US 7,463,143 B2
(45) Date of Patent: *Dec. 9, 2008

(54) METHODS AND SYSTEMS FOR GATHERING MARKET RESEARCH DATA WITHIN COMMERCIAL ESTABLISHMENTS

(75) Inventors: David Patrick Forr, Ellicott City, MD (US); James M. Jensen, Columbia, MD (US); Eugene L. Flanagan, III, Wilton, CT (US)

(73) Assignee: Arbioran, Columbia, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/800,447

(22) Filed: Mar. 15, 2004

(65) Prior Publication Data

US 2005/0200476 A1    Sep. 15, 2005

(51) Int. Cl.
*G08B 1/08* (2006.01)
*H04Q 7/00* (2006.01)
*G08B 5/22* (2006.01)

(52) U.S. Cl. .......................... 340/539.13; 340/539.11; 340/505; 340/520; 340/825.49; 705/10; 705/14

(58) Field of Classification Search .......... 340/539.13, 340/525.49, 539.11, 505, 520, 825.49, 573.1, 340/573.4, 572.1, 10.1, 10.42; 235/375, 235/376; 705/7, 10, 13–14, 36 R See application file for complete search history.

(56) References Cited

U.S. PATENT DOCUMENTS

| 4,930,011 | A |   | 5/1990  | Kiewit |
| 4,973,952 | A | * | 11/1990 | Malec et al. ............... 340/5.91 |
| 5,214,793 | A |   | 5/1993  | Conway et al. |
| 5,461,390 | A |   | 10/1995 | Hoshen |
| 5,483,276 | A |   | 1/1996  | Brooks et al. |
| 5,510,828 | A |   | 4/1996  | Lutterbach et al. |
| 5,541,585 | A | * | 7/1996  | Duhame et al. ............ 340/5.62 |
| 5,612,741 | A |   | 3/1997  | Loban et al. |
| 5,642,303 | A | * | 6/1997  | Small et al. ................. 708/109 |
| 5,764,763 | A |   | 6/1998  | Jensen et al. |
| 5,848,129 | A |   | 12/1998 | Baker |
| 5,923,252 | A |   | 7/1999  | Sizer et al. |
| 5,966,696 | A | * | 10/1999 | Giraud ........................ 705/14 |
| 6,252,522 | B1 | * | 6/2001 | Hampton et al. ............ 340/905 |
| 6,266,442 | B1 |   | 7/2001 | Laumeyer et al. |
| 6,286,005 | B1 |   | 9/2001 | Cannon |
| 6,360,167 | B1 |   | 3/2002 | Millington |

(Continued)

FOREIGN PATENT DOCUMENTS

WO    WO 91/11062    7/1991

OTHER PUBLICATIONS

A New Positioning System Using Television Synchronization Signals; Matthew Rabinowitz and James J. Spiker, Jr.; (date unknown) pp. 1-11.

(Continued)

*Primary Examiner*—George A Bugg
*Assistant Examiner*—Son M Tang
(74) *Attorney, Agent, or Firm*—Katten Muchin Rosenman; Peter Zura

(57) ABSTRACT

Methods and systems for tracking movements of participants in a market research study, for example, within a commercial establishment, are provided. The methods and systems employ portable monitors carried on the persons of the participants to gather location data.

30 Claims, 9 Drawing Sheets

U.S. PATENT DOCUMENTS

| | | | |
|---|---|---|---|
| 6,396,413 B2 * | 5/2002 | Hines et al. | 340/825.49 |
| 6,484,148 B1 | 11/2002 | Boyd | |
| 6,507,802 B1 | 1/2003 | Payton et al. | |
| 6,546,257 B1 | 4/2003 | Stewart | |
| 6,571,279 B1 | 5/2003 | Herz et al. | |
| 6,580,916 B1 | 6/2003 | Weisshaar et al. | |
| 6,647,269 B2 | 11/2003 | Hendrey | |
| 6,720,876 B1 | 4/2004 | Burgess | |
| 6,845,360 B2 | 1/2005 | Jensen et al. | |
| 6,934,508 B2 | 8/2005 | Ceresoli et al. | |
| 6,958,710 B2 * | 10/2005 | Zhang et al. | 340/999 |
| 6,961,555 B1 * | 11/2005 | Philyaw | 455/403 |
| 6,970,131 B2 * | 11/2005 | Percy et al. | 342/357.07 |
| 7,006,982 B2 | 2/2006 | Sorensen | |
| 7,015,817 B2 | 3/2006 | Copley | |
| 2001/0040512 A1 * | 11/2001 | Hines et al. | 340/825.49 |
| 2002/0004740 A1 * | 1/2002 | Shotey et al. | 705/10 |
| 2002/0097193 A1 | 7/2002 | Powers | |
| 2002/0107027 A1 | 8/2002 | O'Neil | |
| 2003/0005430 A1 | 1/2003 | Kolessar | |
| 2003/0055707 A1 * | 3/2003 | Busche et al. | 705/10 |
| 2003/0097302 A1 | 5/2003 | Overhultz et al. | |
| 2003/0122708 A1 | 7/2003 | Percy et al. | |
| 2003/0170001 A1 | 9/2003 | Breen | |
| 2003/0171833 A1 | 9/2003 | Crystal et al. | |
| 2003/0171975 A1 * | 9/2003 | Kirshenbaum et al. | 705/10 |
| 2004/0019675 A1 | 1/2004 | Hebeler, Jr. et al. | |
| 2004/0102961 A1 | 5/2004 | Jensen et al. | |
| 2004/0122727 A1 | 6/2004 | Zhang et al. | |
| 2004/0127192 A1 | 7/2004 | Ceresoli | |
| 2004/0186768 A1 * | 9/2004 | Wakim et al. | 705/14 |
| 2005/0035857 A1 | 2/2005 | Zhang et al. | |
| 2005/0159863 A1 | 7/2005 | Howard et al. | |
| 2005/0201826 A1 | 9/2005 | Zhang et al. | |

OTHER PUBLICATIONS

Is a Next Generation Positioning Technology Necessary?; Matthew Rabinowitz, Ph.D.; James J. Spilker, Ph.D. Jun. 17, 2002; 22 pages total.

Various pages from Web site www.rosum.com; Rosum TV-GPS printed Feb. 16, 2005; 13 pages total.

* cited by examiner

FIGURE 4
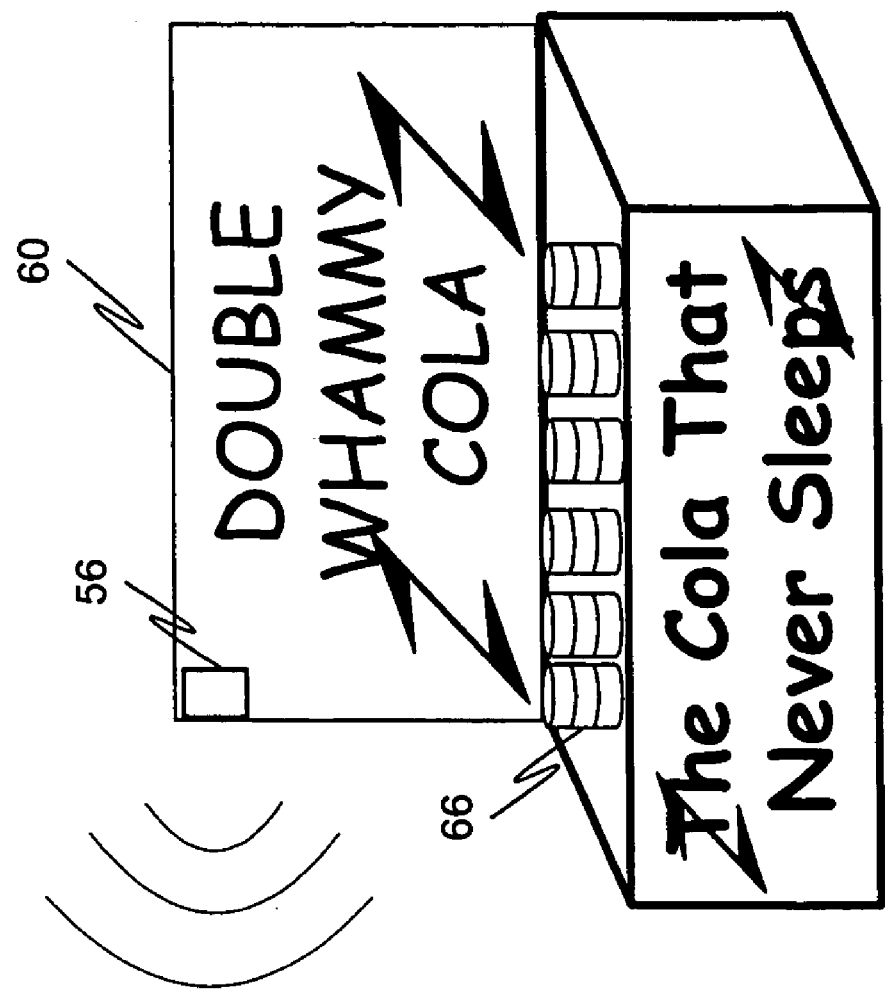
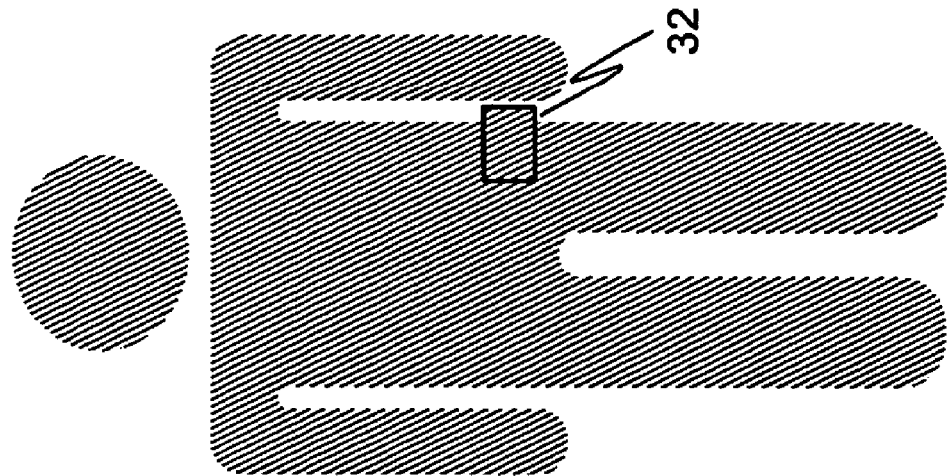

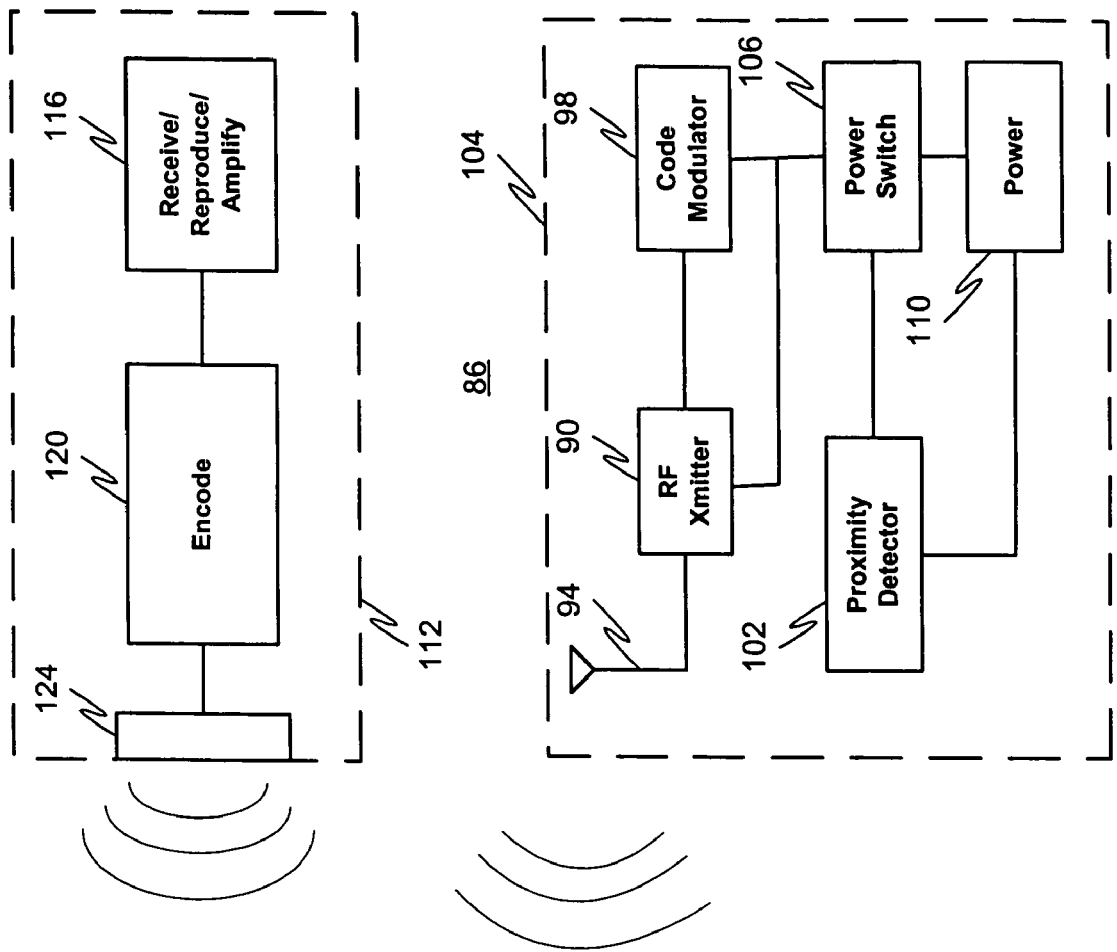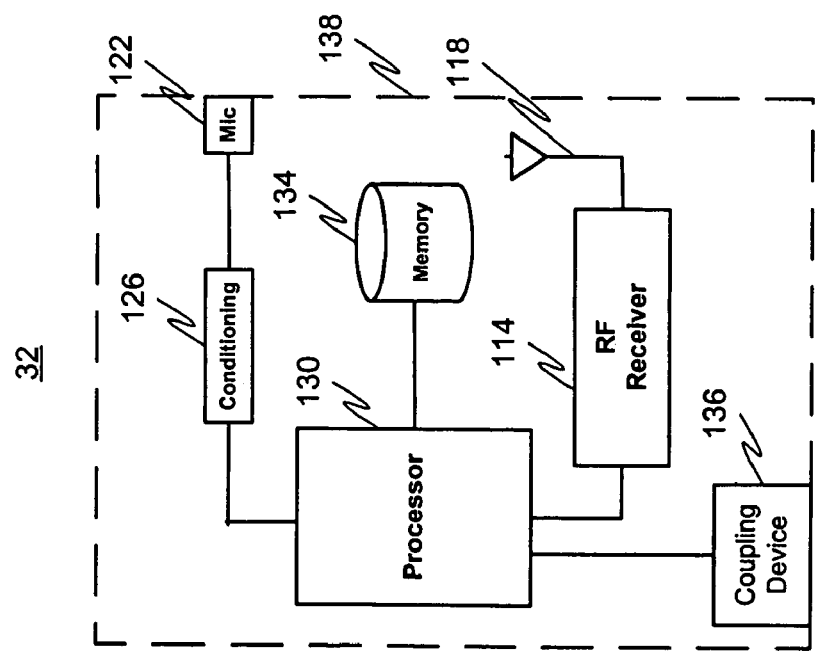
FIGURE 5

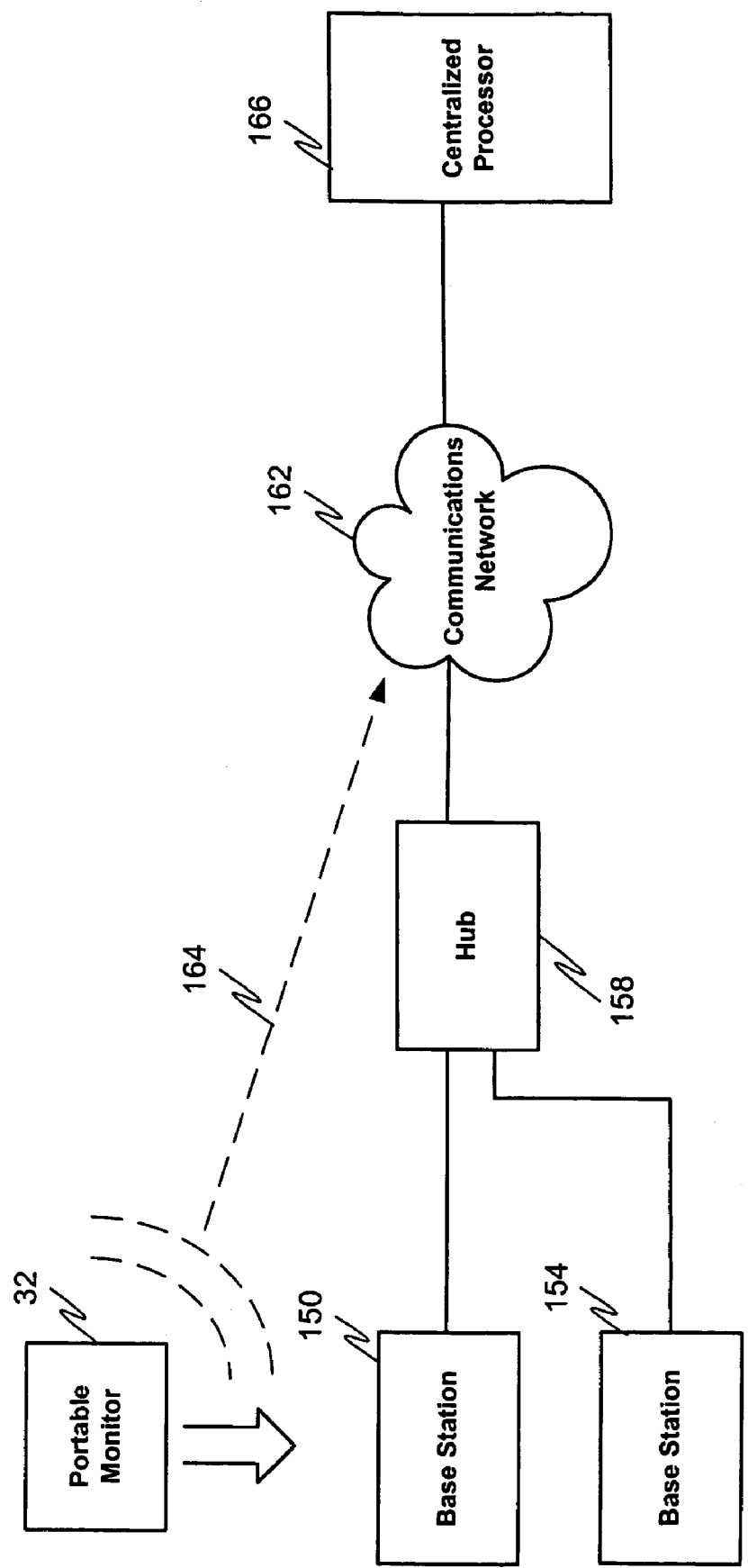

FIGURE 8

| Client | Store | In-Store Location | Transmitter ID | Product and/or Promotional Display | Distributor/Manufacturer |
|---|---|---|---|---|---|
| Ed's Emporium | Bayville | E1 | 9562 | | |
| Ed's Emporium | Bayville | A1M | 8723 | Champ's Chomp Dog Food | Dog's Best Friend |
| Ed's Emporium | Bayville | A1B | 2321 | Double Whammy Cola | Zap! Distributors |
| Ed's Emporium | Bayville | A2F | 5584 | Glug Beer | F, L & H |
| Ed's Emporium | Bayville | A5F | 1950 | Grim Reaper Bug Spray | W&S |
| Ed's Emporium | Bayville | A6B | 7878 | 4 I's Reading Glasses | Optics-R-Us |
| Wilton Market | Wilton | E1 | 1973 | | |
| Wilton Market | Wilton | A1F | 1987 | Henri's Foi Gras | Swanky Frank's |
| Wilton Market | Wilton | A2B | 4527 | Acme Escargot | Snail's Pace |

METHODS AND SYSTEMS FOR GATHERING MARKET RESEARCH DATA WITHIN COMMERCIAL ESTABLISHMENTS

FIELD OF THE INVENTION

The present invention relates to market research methods and systems which gather data concerning the presence of panelists in various locations within commercial establishments.

BACKGROUND OF THE INVENTION

Managers of commercial establishments, such as retail stores, shopping malls, transportation centers and the like, responsible for maximizing sales of products and services, are well aware that the layout of their facilities has a substantial impact on sales volume. To evaluate this impact, it is necessary to gather data characterizing the flow of customer traffic into and within the facility. This data will reveal the locations where customers are present more frequently ("hot spots") and those where customer traffic is lighter ("cold spots").

With this information, it is possible for the manager to make changes in features that affect accessibility, lighting, fixture space, product placement, and the like that will improve product exposure and reduce the number and/or size of cold spots. After such changes have been made, the manager will often wish to conduct a further traffic flow study to assess the effectiveness of these changes.

The tracking data, along with product placement data are also important to distributors of products sold in commercial establishments. This information enables them to evaluate whether their products are receiving sufficient attention in a retail store, so that the cost of shelf space is justified. It also enables them to assess whether they should request shelf space for their products in a different location in the store.

Traditionally such traffic flow studies have been conducted manually. One or more of the manager's employees would record the movements of customers within the facility on a sheet representing its layout. The accumulated data would then be reviewed by the manager. Clearly, this is a labor-intensive way of gathering such data. It is also potentially annoying to customers if the employees tracking them are not very discrete.

It is desired, therefore, to provide a less expensive and less potentially annoying way to gather such traffic flow data. In addition, both managers of commercial establishments as well as manufacturers and distributors would like to obtain reports from which they can evaluate the effectiveness of their advertising expenditures, based not only on such traffic flow data but also on media exposure data and the like.

SUMMARY OF THE INVENTION

For this application the following terms and definitions shall apply:

The term "data" as used herein means any indicia, signals, marks, symbols, domains, symbol sets, representations, and any other physical form or forms representing information, whether permanent or temporary, whether visible, audible, acoustic, electric, magnetic, electromagnetic or otherwise manifested. The term "data" as used to represent predetermined information in one physical form shall be deemed to encompass any and all representations of the same predetermined information in a different physical form or forms.

The term "media data" as used herein means data which is widely accessible, whether over-the-air, or via cable, satellite, network, internetwork (including the Internet), distributed on storage media, or otherwise, without regard to the form or content thereof, and including but not limited to audio, video, text, images, animations, web pages and streaming media data.

The term "database" as used herein means an organized body of related data, regardless of the manner in which the data or the organized body thereof is represented. For example, the organized body of related data may be in the form of a table, a map, a grid, a list or in any other form.

The term "location" as used herein refers to a position relative to a commercial establishment, a product display, a product, another object or facility, or relative to a coordinate system such as latitude and longitude.

The term "layout map" as used herein means a database of data representing locations in a commercial establishment.

The term "network" as used herein includes both networks and internetworks of all kinds, including the Internet, and is not limited to any particular network or inter-network.

The terms "first" and "second" are used to distinguish one element, set, data, object or thing from another, and are not used to designate relative position or arrangement in time.

The terms "coupled", "coupled to", and "coupled with" as used herein each mean a relationship between or among two or more devices, apparatus, files, programs, media, components, networks, systems, subsystems, and/or means, constituting any one or more of (a) a connection, whether direct or through one or more other devices, apparatus, files, programs, media, components, networks, systems, subsystems, or means, (b) a communications relationship, whether direct or through one or more other devices, apparatus, files, programs, media, components, networks, systems, subsystems, or means, and/or (c) a functional relationship in which the operation of any one or more devices, apparatus, files, programs, media, components, networks, systems, subsystems, or means depends, in whole or in part, on the operation of any one or more others thereof.

The terms "communicate" and "communication" as used herein include both conveying data from a source to a destination, and delivering data to a communications medium, system or link to be conveyed to a destination.

The term "processor" as used herein means processing devices, apparatus, programs, circuits, systems and subsystems, whether implemented in hardware, software or both.

The terms "storage" and "data storage" as used herein mean data storage devices, apparatus, programs, circuits, systems, subsystems and storage media serving to retain data, whether on a temporary or permanent basis, and to provide such retained data.

In accordance with an aspect of the present invention, a method is provided for monitoring the presence and/or movements of participants in a market research study. The method comprises providing signal transmitters at predetermined locations within a commercial establishment to wirelessly transmit location signals associated with the locations; providing a wireless receiver to each of a plurality of participants in the market research study, the wireless receiver being adapted to be carried on the person of one of the participants and operative to receive respective ones of the location signals when in a vicinity of each of the locations; associating time data with each of the respective ones of the location signals corresponding to a time of reception thereof; and storing the received respective ones of the location signals and the associated time data within the wireless receiver for use in the market research study.

In accordance with a further aspect of the present invention, a system is provided for monitoring the presence and/or movements of participants in a market research study. The system comprises a plurality of signal transmitters provided at predetermined locations within a commercial establishment to wirelessly transmit location signals associated with the locations; and a plurality of monitors each adapted to be carried on the person of one of the participants in the market research study, wherein each of the monitors includes a wireless receiver operative to receive respective ones of the location signals when in a vicinity of each of the locations, a clock for producing time data associated with each of the respective ones of the location signals when received by the wireless receiver, and a memory coupled to the wireless receiver and to the clock for storing the received respective ones of the location signals and the associated time data within the wireless receiver for extraction and use in the market research study.

In accordance with another aspect of the present invention, a method is provided for gathering data representing customer behavior in a commercial establishment. The method comprises providing a layout map representing a plurality of locations within a commercial establishment; providing a portable monitor to each of a plurality of panelists participating in a customer behavior study to be worn thereby; gathering panelist presence data in the portable monitors representing a presence of respective ones of the panelists at identified ones of the locations within the commercial establishment; and associating the panelist presence data with the plurality of locations represented by the layout map.

In accordance with still another aspect of the present invention, a relational database is provided for storing data representing consumer behavior in a commercial establishment. The relational database comprises a first table storing a plurality of first records, each of the first records including a first field storing wireless transmitter data representing a respective one of a plurality of wireless transmitters provided in the commercial establishment and operative to transmit corresponding transmitter data and a second field storing location data representing a location of the respective one of the plurality of wireless transmitters in the retail establishment; and a second table storing a plurality of second records, each of the second records including a first field representing a consumer participating in a consumer behavior study by carrying a portable monitor and a second field representing a respective one of the plurality of wireless transmitters from which the portable monitor received transmitted corresponding transmitter data.

In accordance with a still further aspect of the present invention, a method is provided for gathering market research data. The method comprises providing a portable monitor to each of a plurality of panelists participating in a market research study to be worn thereby; producing presence data within the portable monitors of ones of the plurality of panelists indicating their presence at a plurality of locations within at least one commercial establishment; and producing media data exposure data within the portable monitors of ones of the plurality of panelists indicating exposure thereof to media data.

In accordance with yet another aspect of the present invention, a relational database is provided for storing data representing consumer behavior in a commercial establishment. The relational database comprises a first table storing a plurality of first records, each of the first records including a first field storing location data identifying a location within a commercial establishment and a second field storing coordinate data representing a position of the location in a predetermined coordinate system; and a second table storing a plurality of second records, each of the second records including a first field representing a consumer participating in a consumer behavior study by carrying a portable monitor and a second field representing coordinates of a position of the consumer in the predetermined coordinate system

BRIEF DESCRIPTION OF THE DRAWINGS

FIG. 4 illustrates a method and system for measuring exposure of a panelist participating in a consumer behavior study to a promotional display in accordance with certain embodiments of the present invention;

FIG. 5 provides block diagrams of certain embodiments of signal transmitters and a portable monitor arranged to be carried on the person of a panelist participating in a consumer behavior study, in accordance with certain embodiments of the present invention;

FIG. 7 is a block diagram of a system for downloading data gathered by the portable monitor of FIG. 5 to a centralized processor;

FIG. 8 illustrates a further table of the relational database including the table of FIG. 3 in accordance with certain embodiments of the present invention;

DETAILED DESCRIPTION OF CERTAIN ADVANTAGEOUS EMBODIMENTS

Figure 1:
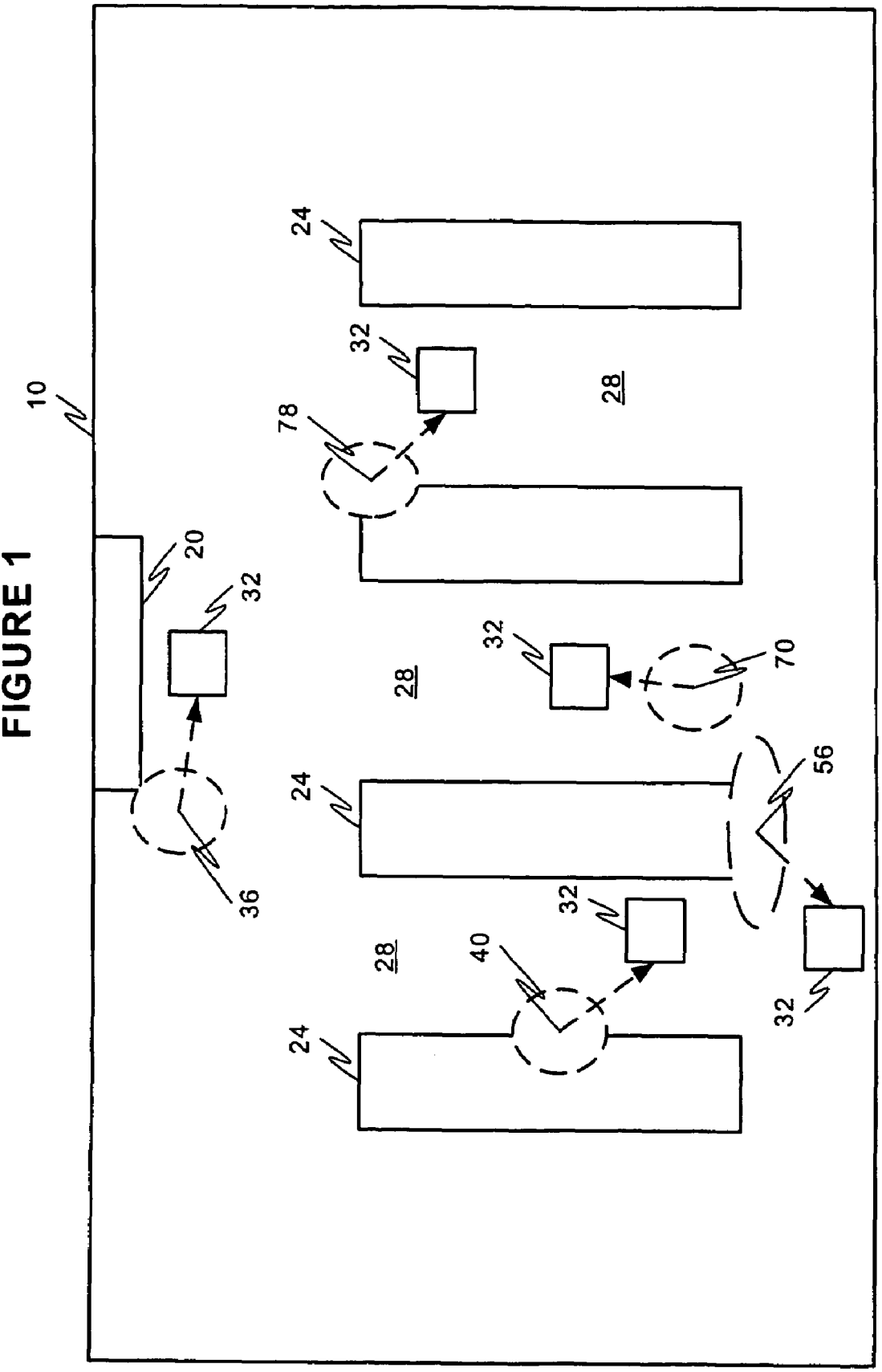
FIG. 1 is a schematic diagram of a floor of a retail store for use in illustrating certain embodiments of the present invention.

The present invention is useful for monitoring the presence and/or movements of customers in all manner of commercial establishments, but is particularly useful for gathering such data in retail stores for carrying out traffic flow studies and/or exposure to advertising and promotional activities. FIG. 1 schematically illustrates a floor of a retail store 10 having an entrance 20 and a plurality of fixtures 24 comprising shelving for products offered for sale. The fixtures 24 define aisles 28 therebetween.

A portable monitor 32 is carried on the person of a panelist participating in a market research study to track the presence and movements of the panelist into and within the retail store, as well as other such retail stores and/or other commercial establishments participating in the study. As depicted in FIG. 1, when the panelist enters the retail store at the entrance 20, the portable monitor 32 carried by the panelist receives a location signal from a radio frequency (RF) transmitter 36 positioned in proximity to the entrance 20. The frequency or frequencies of the location signal can be selected from any permissible frequency range, up to and including microwave frequencies.

The location signal contains data from which the presence of the panelist at the entrance can be determined. Such data in certain embodiments comprises a transmitter identification code that uniquely identifies the transmitter 36. In certain embodiments a commercial establishment identification code is transmitted by the transmitter, along with the transmitter identification code. This transmitter identification code, and commercial establishment identification code, if any, are stored in a database where this data is associated with data identifying the location of the transmitter at the entrance to the retail store. In other embodiments, the location signal contains data that either directly or indirectly identifies the location. In still other embodiments, as described hereinbelow, a commercial establishment identification code is supplied to the monitor 32 for storage therein from another source, such as a separate wireless transmitter.

The strength of the transmitted location signal, along with the sensitivity of the monitor 32 are selected to ensure that monitor 32 will only detect the data contained in the location signal when it is sufficiently near the identified location for the purposes of the study. In certain advantageous embodiments, one or both of the strength of the location signal and the sensitivity of the monitor are selected to ensure that the monitor 32 will only detect the data in the location signal when the monitor is located within a predetermined area to be monitored, such as a predetermined area in which a particular product or product display can be perceived by the panelist. When the monitor 32 detects the data contained in the location signal, it stores either the data or data based thereon, together with a time stamp indicating the time at which the data was received.

Figure 2:
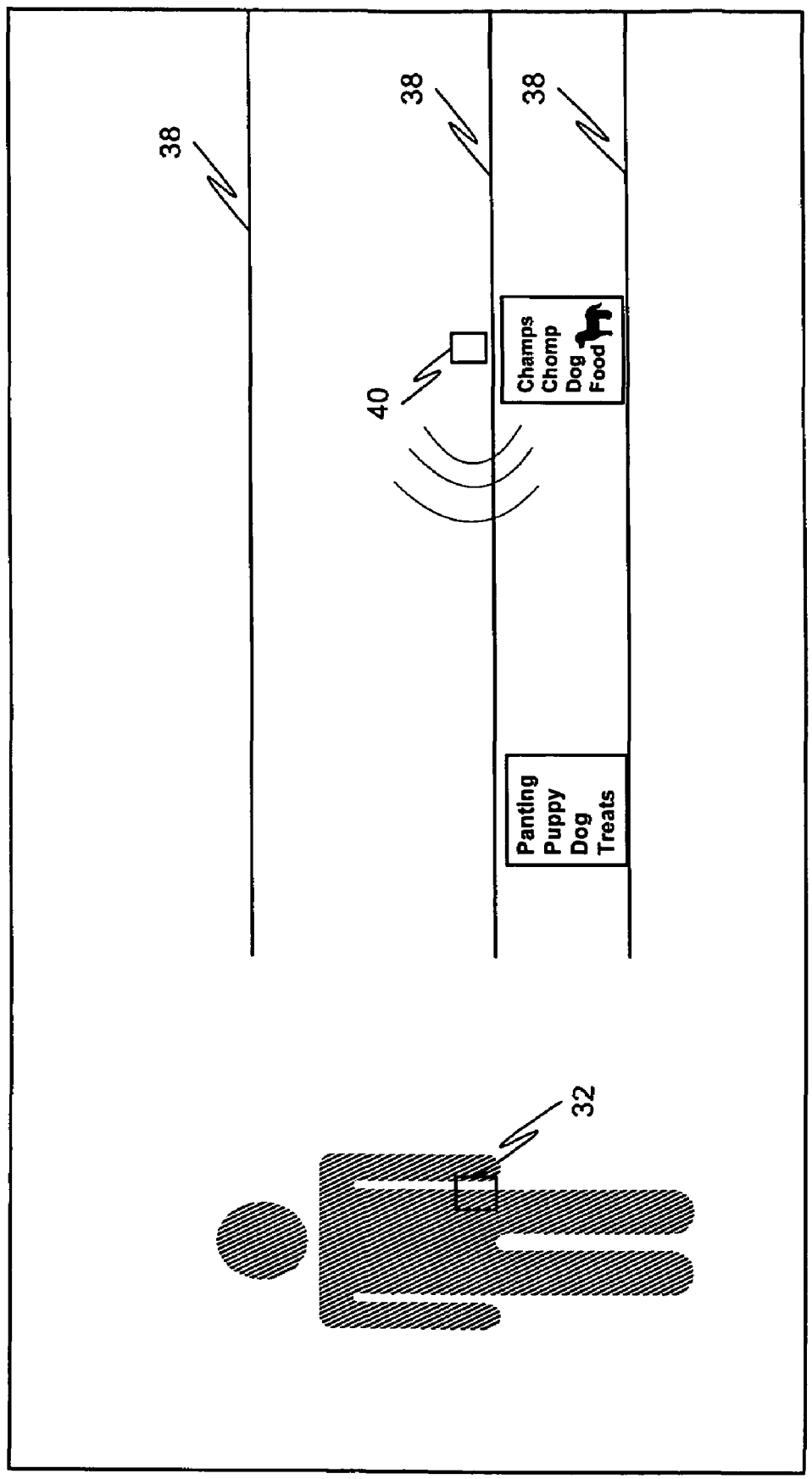
FIG. 2 is a schematic diagram of an aisle of the retail store of FIG. 1.

With reference also to FIG. 2, after the panelist has entered the store and then proceeds down an aisle flanked by shelves 38 holding various products offered for sale, the panelist comes into the range of a transmitter 40. The portable monitor 32 carried by the panelist then detects the data contained in a further location signal from the transmitter 40, and stores it along with a time stamp indicating the time of detection of the further location signal. With reference particularly to FIG. 2, it will be seen that the transmitter 40 has been placed in the vicinity of a particular product offered for sale, here indicated as a fictitious product, Champs Chomp dog food. If the panelist lingers in the vicinity of transmitter 40, this indicates that the panelist may be interested in purchasing the adjacent product.

Accordingly, periodically or from time to time the monitor 32 checks for the detection of the data contained in the same or a different location signal. If the data of the further location signal has again been detected, the monitor 32 stores further data indicating a duration of the continuous presence of the panelist in the vicinity of transmitter 40.

Figure 3:
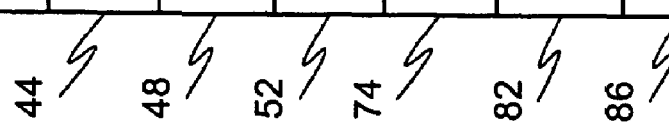
FIG. 3 illustrates a table of a relational database in accordance with certain embodiments of the present invention.

FIG. 3 illustrates an embodiment of a table storing the location data and commercial establishment identification data detected by the monitor 32 from various location signals, together with time stamps indicating a time of detection of the data and the duration of continuous detection of the same data. In the exemplary table of FIG. 3, each row represents a record of the detection of the data from a respective transmitter, here represented as a transmitter ID, along with a monitor ID (which corresponds to the panelist to whom the particular monitor has been assigned), the time at which the data from that transmitter was first detected and a duration of continuous detection of the data from such transmitter. In certain other embodiments the data detected by the monitor is stored without the monitor ID which is not associated with the other stored data until it has been downloaded from the monitor 32.

A first record 44 of the FIG. 3 table is an example of the data stored by portable monitor 32 upon detection of the data contained in a location signal received from transmitter 36 when the panelist enters the retail store through entrance 20. In the embodiment of FIG. 3, each transmitter transmits a signal containing location data as well as commercial establishment data (here indicated as a fictitious retail store, Ed's Emporium). In other embodiments, separate transmitters transmit commercial establishment data. In certain embodiments, the commercial establishment data directly identifies the commercial establishment, while in others the commercial establishment data is used to access or derive such identity. In certain embodiments, the commercial establishment data relates to the commercial establishment, with or without identifying it directly or indirectly. In certain embodiments, the identity of the commercial establishment in which a location signal transmitter is located is determined based solely on previously stored data associating a transmitter ID with the store or other establishment in which it is located. Returning to record 44 of FIG. 3, the recorded duration of this detection is indicated to be less than 5 seconds. A second record 48 stores data detected by monitor 32 in the vicinity of transmitter 40. Here the record indicates that the panelist remained for 20 seconds indicating interest in Champs Chomp dog food in Ed's Emporium.

A further record 52 of the FIG. 3 table represents data gathered by the monitor as the panelist pauses in the vicinity of a transmitter 56 shown in FIG. 1 near the end of a store fixture 24. FIG. 4 illustrates the transmitter 56 mounted on an in-store product display 60 for a fictitious soft drink product, Double Whammy cola. As shown in FIG. 4, the product display 60 serves to attract attention to the product 66 which it carries or contains. As the panelist stops by the product display 60, the monitor records data indicating the duration of the panelist's presence near the product display providing an indication of its effectiveness in attracting consumer attention.

With reference again to FIG. 1, as the panelist proceeds down another aisle, the monitor 32 detects data contained in a location signal from a transmitter 70 placed above the aisle to estimate the amount of traffic therethrough to detect whether the aisle is a "cold spot" in the store. The detected data is stored by the monitor 32 in a record such as exemplary record 74 shown in FIG. 3.

Still later the panelist pauses in the vicinity of another transmitter 78 to examine a product, as indicated by record 82 in FIG. 3. Shortly thereafter, the panelist proceeds to the stores' checkout counter (not shown for purposes of simplicity and clarity) to pay for the selected products, and then leaves the store as indicated by record 86 in FIG. 3.

FIG. 5 provides a block diagram of certain embodiments of the portable monitor 32, along with a block diagram 86 of certain embodiments of the transmitters 36, 40, 56, 70 and 78. In the diagram 86, an RF transmitter 90, antenna 94, code modulator 98, proximity detector 102, power switch 106 and power source 110 are enclosed or carried within a container 104. The container 104 preferably is small and otherwise inconspicuous, so that it is unnoticed by panelists and thus does not influence their behavior. In certain embodiments, the transmitters are contained in a thin laminated package that can be affixed inconspicuously to the bottom of a store shelf. In others they are carried in a small housing or encapsulated in molded plastic.

In the transmitter embodiment 86, power from the power source 110 is only applied to the RF transmitter 90 and code modulator 98 when the proximity detector 102 detects the presence of a person in proximity to the transmitter 86 and turns on the normally off power switch 106. The proximity detector 102 senses a selected form or forms of data indicating the presence or approach of a person, such as changes or levels of infrared, thermal, light, or electrical energy, and then provides a switching signal to power switch 106 to turn it on.

In certain embodiments an external switch is employed to switch on power, such as a pressure sensitive switch activated by the panelist's footstep or a doorway switch actuated by opening a door or passing through a doorway. Preferably power switch 106 remains on only long enough to ensure that a detectable location signal is transmitted to any monitor 32 that may be carried by a panelist nearby, so that power from the source 110 is conserved to ensure the continuing ability of the transmitter 86 to function. As an example only, in certain embodiments the power switch applies power continuously for 30 seconds after receipt of the switching signal and then automatically resets to an off state, so that the location signal is transmitted continuously for such 30 second period. In certain embodiments, the transmitter has two operational states, a standby, low power mode in which it does not transmit and a transmit mode in which it does. In such embodiments, the switch 106 or other circuitry switches the transmitter from the standby mode to the transmit mode when a person's proximity is detected.

The RF transmitter 90 drives antenna 94 to transmit an RF location signal within an appropriate band selected as any permissible RF band up to and including microwave frequencies. In certain embodiments the RF transmitter 90 produces the location signal in an unlicensed 900 MHz band and at a sufficiently low power level so that its data will be detectable by monitor 32 only within a relatively short range.

The data contained by the location signal is produced by code modulator 98 and applied as a modulating signal by code modulator 98 to RF transmitter 90. In certain embodiments, the data represents an identification of the transmitter itself, while in others it directly represents the location of the transmitter 86 or store or other commercial establishment. The location signal can be modulated in any manner that is compatible with the detection capabilities of portable monitor 32, such as by amplitude, frequency, pulse or phase modulation or any combination thereof. In certain embodiments the data is simply represented by the frequency of the location signal, so that a separate code modulator is not required. In certain embodiments, the data modulates the location signal to produce a periodically repeating code. As an example, such a code could repeat every 10 seconds during the transmission of the location signal, although a different repetition rate could be selected depending on the amount of data that must be transmitted and the detection error rate of the personal monitor 32 within the desired detection area.

The power source 110 is selected as one that is capable of supplying sufficient power for a desired duration, such as the duration of the marketing study. The power source 110 in certain embodiments is selected as a rechargeable battery, a non-rechargeable battery, an energy storage device, a photoelectric power source and/or a different energy receiving device such as an antenna receiving energy from the portable monitor 32 or other external source.

In certain embodiments rather than transmit upon detection of a person in proximity to the transmitter 86, the RF transmitter 90 transmits the location signal periodically. In still other embodiments the RF transmitter 90 transmits the location signal in response to a query signal transmitted from a transmitter included in the portable monitor 32 (not shown for purposes of simplicity and clarity). In certain embodiments, the transmitter is an RFID tag that receives a read signal from the monitor 32, and uses the energy of the received read signal to encode its data and retransmit the encoded data as a location signal. In embodiments which employ such RFID tags, it is advantageous to selectively key the monitor on to transmit such read signal as infrequently as possible, due to the relatively large amount of energy that must be transmitted by the monitor 32 to energize the RFID tag to retransmit a detectable location signal. For this purpose, in certain embodiments a transmitter is provided in or near the commercial establishment to key the monitor to transmit the read signal.

In certain embodiments, one or more RF energy emitters separate from the monitors 32 are placed in or near the store or other commercial establishment to emit RF energy to be received by one or more nearby RFID tags in order to energize them to transmit their codes. When a panelist carrying a monitor 32 comes within range of one of such RFID tags, the monitor detects its code and stores appropriate data. In certain embodiments, the RF energy emitters emit RF energy continuously. In others, the RF energy emitters emit RF energy periodically, from time to time, at certain times or during certain time periods. In still other embodiments, the RF energy emitters emit RF energy upon detecting either a presence of a person or of a monitor 32.

In other embodiments in place of an RF transmitter 90, the transmitter 86 employs a different type of wireless transmitter, such as an infrared, visible light or acoustic transmitter. An appropriate acoustic location code emitter for this purpose is disclosed in U.S. published patent application 20030171833 A1 in the names of Jack C. Crystal and James M. Jensen, assigned to the assignee of the present application and hereby incorporated in its entirety herein by reference.

FIG. 5 also provides a block diagram of an embodiment of the portable monitor 32 which includes an RF receiver 114, an antenna 118, a microphone 122, conditioning circuitry 126, a processor 130, a memory 134, a coupling device 136 and an enclosure 138 containing all of the foregoing elements of portable monitor 32. The enclosure preferably is sufficiently small to permit the portable monitor 32 to be carried in or on an article of clothing worn by the panelist, such as a belt, pocket, collar or lapel, or on the panelist's wrist or elsewhere. In certain embodiments the enclosure 138 is provided with a clip, loop, necklace, band, pin or other device (not shown for purposes of simplicity and clarity) to affix or hang the monitor 32 to or from such an article of clothing or to the panelist's wrist, neck or elsewhere. In certain embodiments, the enclosure 138 has a size and shape similar to a pager, or cellular telephone. In certain embodiments, enclosure 138 has a size and shape similar to a credit card or smart card, so that it can be carried in a panelist's pocket or wallet or attached to a keychain. In still other or related embodiments, the enclosure 138 takes the form of a wristwatch, wristlet, card case, key fob, change purse, article of jewelry or other decorative or useful article, or else is adapted to be carried by or attached to one or more of the foregoing.

RF receiver 114 has an input coupled with antenna 118 to receive the location signal and is operative to detect the data therein and supply it at an output coupled with processor 130 in a form suitable for input to the processor 130. Preferably, the receiver 114 is operated only periodically, or from time to time, in order to conserve power in the portable monitor 32. For example, in certain embodiments the receiver 144 is turned on for a 10 second period during a repeating 30 second interval.

Where the transmitter 86 transmits the location signal in a different form, such as infrared or visible light, wireless receiver 114 and antenna 118 are replaced in other embodiments of the portable monitor 32 by a suitable light sensor and conditioning circuitry coupled with the light sensor and operative to detect the data contained in the location signal and supply it in a suitable form to the processor 130. Where the transmitter 86 instead transmits an acoustic location signal, in certain embodiments of portable monitor 32 the microphone 122 and conditioning circuitry 126 serve to receive the location signal and supply it in suitable form to the processor 130. In certain ones of such embodiments the processor 130 serves to detect the data contained in the location signal transmitted in acoustic form.

The processor 130 is also operative to store the detected location data with a time stamp produced by processor 130 or else by a separate clock (not shown for purposes of simplicity and clarity). Where the processor continues to receive the same location code, in certain embodiments it produces duration data indicating a duration of continuous receipt of the same location data and stores it in association with the location data and time stamp. In certain other embodiments, in place of duration data, the processor instead stores an ending time stamp representing a point in time when it no longer continues to receive the same location data. In still other embodiments, the processor simply stores each detection of the location data with a respective time stamp associated therewith.

The embodiments of portable monitor 32 illustrated in FIG. 5 also serve to monitor exposure of the panelist to media data having an acoustic component, such as radio and television broadcasts, prerecorded content and streaming media. This is achieved in certain embodiments by processing acoustic data received by microphone 122 in processor 130. Processor 130 analyzes the acoustic data to detect the presence of an ancillary code therein or to extract a signature therefrom, which can be used to identify or otherwise characterize the media data. Suitable analysis techniques are disclosed in published U.S. patent application 20030005430 A1 in the name of Ronald S. Kolessar, assigned to the assignee of the present invention and hereby incorporated herein by reference in its entirety. The monitor 32 stores such media data exposure data in storage 134 together with time stamps representing timing of exposure thereto. Preferably, the time stamp is obtained from the same source as that stored with the data indicating detection of the location data so that the time stamps are all on the same predetermined time base.

In certain embodiments, a commercial establishment signal is transmitted to the monitor 32 by a transmitter other than those employed as in FIG. 1 to represent particular locations within store 10 or other commercial establishment. Such a transmitter used to transmit a commercial establishment signal, containing data such as store identification data, store location data or other data representing a commercial establishment, comprises an RF transmitter in certain embodiments, and in others comprises a light signal transmitter which transmits infrared or visible light.

In still other embodiments, an acoustic transmitter is employed to transmit the commercial establishment signal. An embodiment of such an acoustic transmitter is illustrated in FIG. 5 as acoustic transmitter 112. Acoustic transmitter 112 is positioned to emit acoustic energy such as broadcast, streaming or reproduced audio (for example, music) and/or public address audio (such as announcements to shoppers), within the commercial establishment, such as store 10. A source of such audio is represented by device 116 of transmitter 112.

Acoustic transmitter 112 also comprises an encoder 120 which receives the audio from source 116 and encodes the commercial establishment data therein. Encoder 120 evaluates the ability of the received audio to mask the data when encoded in the audio and produces or adjusts the level, frequency, phase and/or other characteristic of the data to be encoded or as encoded, so that the code is inaudible when the audio is reproduced as sound. The encoded audio is output by the encoder 120 to a speaker 124 which emits the encoded audio as acoustic energy.

The encoder 120 in certain embodiments comprises an encoder of the kind disclosed in U.S. patent application 10/302,309 in the names of James M. Jensen and Alan R. Neuhauser, assigned to the assignee of the present application and incorporated herein by reference in its entirety and/or of the kind disclosed in U.S. Pat. No. 5,764,763 in the names of James M. Jensen, et al, assigned to the assignee of the present application and incorporated herein by reference in its entirety.

In certain embodiments the audio supplied from the source 116 is already encoded with the commercial establishment signal, for example, by encoding the audio and storing it for later reproduction. In still other embodiments, rather than encode an audio signal the acoustic transmitter samples the ambient acoustic energy to evaluate its ability to mask the commercial establishment signal and emits the commercial establishment signal having appropriate characteristics to ensure that the ambient acoustic energy will mask it. Embodiments of such acoustic transmitters are disclosed in U.S. published patent application 20030171833 A1, mentioned above.

In certain embodiments of the present invention which employ acoustic transmitters to transmit location signals and/or commercial establishment signals, the personal monitor 32 employs the microphone 122 to receive such acoustic signals and detects the data therein by means of the processor 130. In certain ones of such embodiments, the processor 130 advantageously employs a detection technique disclosed in U.S. Pat. No. 5,764,763, mentioned above, to detect the data encoded in the various acoustic signals.

In certain embodiments, acoustic transmitters are employed both to emit location signals at various locations throughout a commercial establishment, but also to transmit a commercial establishment signal. In such embodiments it is possible to dispense with the use of an RF receiver in monitor 32. In certain ones of such embodiments used to monitor a panelist's presence at or near a small commercial establishment, such as a kiosk in a shopping mall, an acoustic transmitter is employed to transmit an acoustic signal in the vicinity of the commercial establishment containing commercial establishment data identifying or otherwise relating to it. When a panelist carrying a monitor 32 approaches such a commercial establishment closely enough so that the panelist can perceive it or the products or services it offers, the monitor 32 detects and stores the commercial establishment data to record the panelist's presence.

In certain embodiments wherein the location transmitters 36, 40, 56, 70 and 78 comprise acoustic transmitters, the acoustic transmitters transmit acoustic signals containing both location data and commercial establishment data to the monitor 32 which detects and stores both of these data from the received acoustic signal. In certain advantageous embodiments, both the location data and the commercial establishment data are encoded and detected according to techniques disclosed in U.S. patent application Ser. No. 10/302,309, mentioned above. In one such encoding technique, the location data and commercial establishment data are transmitted repeatedly, but each has a different duration. The monitor 32 employs two accumulators, one of which is a register having a length selected to accumulate the location data and the other of which is a different register having a length selected to accumulate the commercial establishment data. Although components of each of the data are accumulated in both registers, a register having a length selected to accumulate the location data, for example, will additively accumulate components of the location data, but will not accumulate corresponding components of the commercial establishment data, so that the commercial establishment data will appear as noise in this register.

Figure 6:
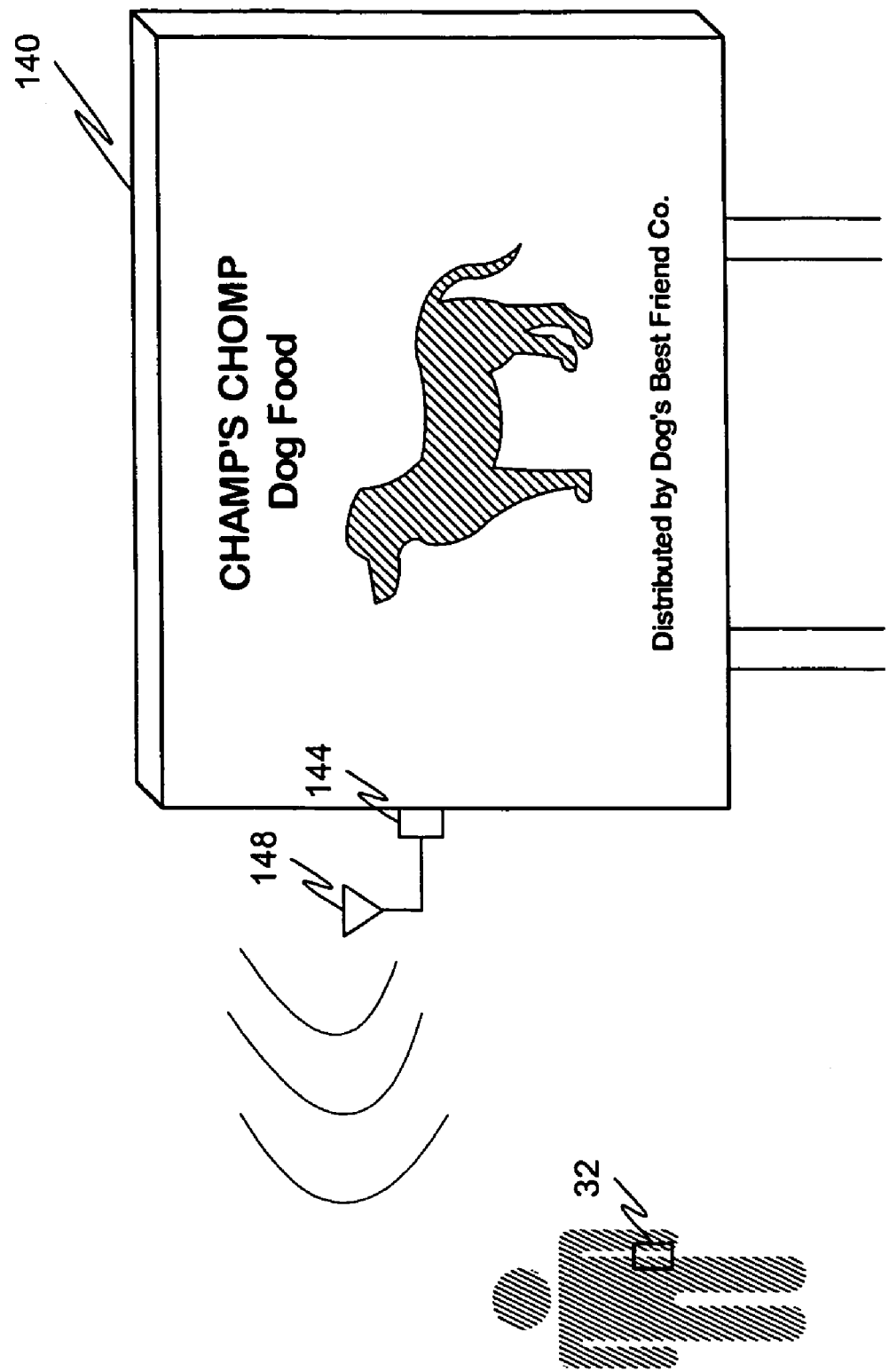
FIG. 6 illustrates use of the portable monitor of FIG. 5 for measuring exposure of the panelist carrying the portable monitor to a media display in accordance with certain embodiments of the present invention.

In certain embodiments portable monitor 32 serves to monitor exposure to media displays in outdoor settings, such as highways, railways, and walkways, and/or in indoor settings, such as malls, subways, railway stations, bus stations, airports and building lobbies. FIG. 6 illustrates a use of monitor 32 for this purpose, in particular, to monitor exposure of a panelist carrying portable monitor 32 to a billboard advertisement, in FIG. 6 shown as an advertisement 140 for a fictitious dog food product. In the embodiment of FIG. 6, an RF transmitter 144 drives an antenna 148 to transmit a billboard proximity signal at a power level chosen to ensure that billboard proximity data contained in the signal can only be detected by portable monitor 32 when it is positioned at a location from which the panelist can view the billboard advertisement. The billboard proximity data is stored by the monitor 32 along with a time stamp representing a time of exposure to the billboard advertisement 140. Preferably, the time stamp is obtained from the same source as that stored with the data indicating detection of the location data so that the time stamps are all on the same predetermined time base.

In certain embodiments receiver 114 of portable monitor 32 is arranged to receive the billboard proximity signal and detect the billboard proximity data therein. In other embodiments, a different wireless receiver is included in monitor 32 for this purpose. Further embodiments of media display exposure monitoring means suitable for use in monitor 32 are disclosed in U.S. patent application Ser. No. 10/329,132 in the names of Jack K. Zhang, Jack C. Crystal and James M. Jensen, assigned to the assignee of the present application and hereby incorporated by reference herein in its entirety. Still further embodiments of media display exposure monitoring means suitable for use in monitor 32 are disclosed in U.S. patent application Ser. No. 10/640,104 in the names of Jack K. Zhang, Jack C. Crystal, James M. Jensen and Eugene L. Flanagan III, assigned to the assignee of the present application and hereby incorporated by reference herein in its entirety.

FIG. 7 illustrates a system for communicating the data stored in the personal monitor 32, as well as other personal monitors 32 assigned to other members of the same household acting as panelists in the same study, to a centralized processor 166 for use in producing reports of interest to store managers, distributors, manufacturers, other advertisers, media organizations, etc. In certain embodiments, from time to time, or periodically, each panelist in the household docks his/her portable monitor 32 in a respective base station 150, 154 to download data stored in the portable monitors. The monitor 32 communicates with the base station by means of the coupling device 136 (see FIG. 5), which in certain embodiments is an optoelectronic coupling device. In certain embodiments, the monitor communicates with the base station by means of an RF transceiver or other wireless transceiver (not shown for purposes of simplicity and clarity) without docking the monitor in the base station. This communication is initiated either by the monitor 32 or the base station 150, 154, periodically, at a predetermined time or from time to time. In certain further embodiments, the portable monitor 32 comprises a wireless network transceiver (not shown for purposes of simplicity and clarity) to establish a wireless link 164 to the communications network 162 to download data, using a WiFi or other wireless networking protocol. In still further embodiments, the portable monitor 32 comprises a cellular telephone module (not shown for purposes of simplicity and clarity) to establish a wireless link with a telephone network to download data.

Once the data has been downloaded, the memory 134 of the monitor 32 is reset to store further data. The base stations may be, for example, those disclosed in U.S. Pat. No. 5,483,276 to Brooks, et al., assigned to the assignee of the present invention and hereby incorporated herein by reference in its entirety. The base stations 150, 154 communicate with a communications hub 158 also located in the household for communication via a network 162 to the centralized processor 166 located remotely from the household. The centralized processor 166 likewise receives data from other panelists' households to produce reports as mentioned above.

The centralized processor 166 stores the received data in one or more databases from which it is accessed to produce such reports. A relational database for use in storing the downloaded data gathered by monitors 32 in various commercial establishments, for use in producing reports concerning consumer behavior in such commercial establishments, is now described with reference to FIGS. 3 and 8. FIG. 8 illustrates a table 170 that stores records identifying the various transmitters 86 (FIG. 5) employed in the consumer behavior study by transmitter ID along with the commercial establishment (a store in this illustration) in which it is located and the specific location of the transmitter therein. For example, row 174 of table 170 provides an examplary record for a transmitter having ID "9562" installed in a fictitious retail store, Ed's Emporium, in the village of Bayville and located near the entrance of this store.

Table 170 also provides data identifying a product or promotional display at the location of certain ones of the transmitters 86, as well as the distributor or manufacturer of such product or promotional display. For example, row 178 of FIG. 8 provides an examplary record for a transmitter having transmitter ID "8723" installed in the fictitious retail store mentioned above and at the location of a fictitious product, Champ's Chomp dog food, offered for sale in the store. The record of row 178 also identifies the manufacturer or distributor of the product, here indicated as a fictitious business entity, Dog's Best Friend. Similarly, table 170 includes many other such records, each for a respective transmitter identified by its transmitter ID, and indicating its location by store, in-store location and store owner or client, and as appropriate, either the product or promotional display at such location, and its distributor or manufacturer. It is noted that all of the clients or store owners, as well as the products and their respective manufacturers or distributors listed in table 170, are fictitious and serve only to illustrate exemplary records.

In certain embodiments, the table of FIG. 8 is compiled from data supplied by personnel engaged to install the transmitters in the various commercial establishments participating in the study. In certain embodiments, the data is supplied in written form by such personnel to data entry personnel who populate the table 170 of FIG. 8. In certain embodiments, the personnel instead log the locations of previously installed wireless transmitters and distinctive data provided thereby. Such previously installed transmitters include wireless communication devices installed with intelligent shelves. The intelligent shelves serve to gather data concerning the products placed thereon for inventory control purposes and communicate such data as well as the identity of the intelligent shelf to a data gathering system of the commercial establishment. Certain embodiments of the present invention make use of the identity data where it is transmitted wirelessly from the intelligent shelf. Certain of these embodiments also gather data concerning the products placed on the intelligent shelves for populating the "product" field of the table of FIG. 8.

Preferably the data is compiled in the table from records communicated from portable electronic devices in the possession of the personnel installing or logging the transmitters in the various participating establishments. Suitable electronic devices for this purpose are disclosed in U.S. patent application Ser. No. 10/800,884 filed concurrently herewith in the names of Jack K. Zhang and James M. Jensen.

As described above, FIG. 3 illustrates a table recording detections of various ones of the transmitters 86 by the monitor 32, along with the times at which each was detected and the duration of continuous detection of the same transmitter location signal. The table of FIG. 3, together with the table of FIG. 8 comprise a relational database providing the ability to map panelist exposures to various products and promotional displays within the participating commercial establishments as well as to assess traffic flow through the participating commercial establishments. It is thus possible to produce reports of various kinds useful to the managers of such commercial establishments as well as the distributors and manufacturers whose products are offered for sale therein.

In certain ones of such reports, the presence/exposure data of FIG. 3 and the data of FIG. 8 is processed to estimate the frequency, duration and density of exposure of consumers to various locations, products and promotional displays within each of the participating establishments whether based on time of day or otherwise. By means of the table of FIG. 8, such data is readily presented by overlaying the same on a layout map of the establishment, and the identity of the products and promotional materials at the corresponding locations is likewise readily presented on the same map as an overlay in correspondence with the frequency, duration and density of exposure data described above to enable store managers, manufacturers and distributors to assess the exposure of various products and promotional materials in the store or other establishment. It is thus possible based on such reports to formulate placement recommendations for products and promotional materials in retail stores.

It is likewise possible with the same data to produce traffic flow reports which enable the store managers to determine the locations of "hot spots" and "cold spots" within their commercial establishments. Store managers are thus enabled to evaluate whether changes should be made in the layouts of their establishments to improve customer traffic and increase exposure of product and service offerings.

As noted above, in certain embodiments of the personal monitors 32, not only is such data gathered but also data indicating exposure to media data such as television and radio broadcast exposure, as well as exposure to media displays, both outdoor and indoor. The systems and methods of the present inventions thus provide integrated data measuring not only behavior of consumers within commercial establishments but also exposure of such consumers to media data and the advertisements conveyed thereby. It is thus possible to evaluate the effects of the exposure to advertising of predetermined individuals to their behavior in commercial establishments, especially in regard to interest in particular products that may be stimulated by such advertising.

Further embodiments of a system and method for monitoring the presence and movements of a panelist within a commercial establishment in accordance with certain embodiments of the present invention are now described. In certain embodiments the receiver 114 of portable monitor 32 receives one or more signals from one or more wireless transmitters within or near the commercial establishment, but not associated with particular locations within the commercial establishment, and generates location data indicative of a location of the portable monitor 32 within the commercial establishment based upon the received signals. In other embodiments, the monitor 32 includes a GPS receiver (not shown for purposes of simplicity and clarity) to obtain such position data in the form of latitude and longitude. In certain advantageous embodiments, the monitor employs an assisted GPS location system.

In certain other embodiments the portable monitor transmits a signal that is received by one or more receiving devices within or near the commercial establishment to determine the location of the portable monitor. In still other embodiments, the portable monitor includes a cellular telephone module (not shown for purposes of simplicity and clarity) that communicates with a cellular telephone system to obtain data therefrom representing the location of the portable monitor 32 based on signals received from the cellular telephone module. Such location data is provided as latitude and longitude or in another usable form. In still further embodiments, the portable monitor 32 employs at least one of the following techniques to generate the location data: an angle of arrival (AOA) technique, a time difference of arrival (TDOA) technique, an enhanced signal strength (ESS) technique, a location fingerprinting technique, and an ultra wideband location technique. Each of these techniques is now briefly described.

The angle of arrival (AOA) technique determines the direction of a signal received from a radio frequency (RF) transmitter. This can be done by pointing a directional antenna along the line of maximum signal strength. Alternatively, signal direction can be determined from the difference in time of arrival of the incoming signals at different elements of the antenna. A two-element antenna is typically used to cover angles of ±60 degrees. To achieve 360-degree coverage, a six-element antenna can be used. However, a single mobile directional antenna can give only the bearing, not the position, of a transmitting object.

With two directional antennas spaced well apart, however, the position of a transmitting device in a plane can be computed. In this method, also known as the angle of arrival (AOA) method, transmitter position is determined from the known (fixed) position of the receivers' antennas and the angle of arrival of the signals with respect to the antennas. In certain embodiments the portable monitor 32 includes a transmitter that enables its location to be determined in accordance with the angle of arrival method.

The time difference of arrival (TDOA) technique is based upon the similar concept that the difference in time of arrival between signals received at antennas at different locations can be used to determine position. Given the speed of light and known transmit and receive times, the distance between a transmitter and the receiver antenna can be calculated. In certain embodiments the portable monitor 32 includes a transmitter that enables its location to be determined in accordance with the time difference of arrival technique.

In an alternative time difference scheme, the monitor and the antennas reverse roles: the antennas are transmitters and the portable monitor 32 incorporates a receiver. This technique is known as forward link trilateration (FLT). This is relatively simple to implement in some code-division multiple access (CDMA) wireless systems, where the time difference of arrival can be determined from the phase difference between pseudo-random noise code sequences of 0s and 1s transmitted from two antennas. In certain embodiments the portable monitor 32 includes a receiver, such as a CDMA cellular telephone receiver, that enables its location to be determined in accordance with the forward link trilateration method.

When the term "time difference of arrival technique" is used herein, the term is meant to encompass both the traditional time difference of arrival (TDOA) method and the forward link trilateration (FLT) method.

The enhanced signal strength (ESS) method provides improvements over conventional signal strength methods by overcoming such impediments as multipath effects, attenuation, and antenna orientation. The method involves taking in three-dimensional information on the objects, walls, and other features and obstructions within the commercial establishment, and using such information to simulate the RF signal propagation characteristics of wireless transmitting antennas in the area. A location system center stores the results in an RF database. The position of the portable monitor is determined by getting it to measure the signal strength of preferably three to five base transmitters. From this input plus information from the database, the system can calculate the position of the portable monitor. Inside large commercial establishments, such as malls and department stores with appropriate base transmitters located therein, the position of a portable monitor can be determined by means of the ESS method. In certain embodiments the portable monitor 32 includes a receiver that enables its location to be determined in accordance with the ESS method.

The location fingerprinting technique, instead of exploiting signal timing or signal strength, relies on signal structure characteristics. The technique turns the multipath phenomenon to good use by combining the multipath pattern with other signal characteristics, to create a signature unique to a given location. A location fingerprinting system includes a signal signature database of a location grid for a specific area. To generate this database, a device is walked through the area transmitting or receiving signals to or from a monitoring site. The system analyzes the incoming signals, compiles a unique signature for each square in the location grid, and stores it in the database.

To determine the position of a mobile transmitter or receiver, the system matches the transmitter's or receiver's signal signature to an entry in the database. Multipoint signal reception is not required, although it is preferable. The system can use data from only a single point to determine location. In certain embodiments the portable monitor 32 includes a transmitter or a receiver that enables its location to be determined in accordance with the location fingerprinting technique.

In certain ultra wideband location techniques a network of localizers determine relative locations in three-dimensional space by measuring propagation times of pseudorandom sequences of electromagnetic impulses. The propagation time is determined from a correlator which provides an analog pseudo-autocorrelation function sampled at discrete time bins. The correlator has a number of integrators, each integrator providing a signal proportional to the time integral of the product of the expected pulse sequence delayed by one of the discrete time bins, and the non-delayed received antenna signal. Using pattern recognition the arrival time of the received signal can be determined to within a time much smaller than the separation between bins.

In certain ultra wideband techniques, wireless ultra wideband transceivers are positioned at known stationary locations within the area to be monitored, and the portable monitor 32 includes a wireless ultra wideband receiver/processor that receives one or more timed pulses from the various transceivers and resolves the location of the portable monitor within the monitored area based on the locations of the ultra wideband transceivers and time-of-flight measurements of the pulse or pulses. In certain embodiments, the portable monitor 32 includes an ultra wideband transmitter and a plurality of interacting receivers in stationary positions receive a pulse from the transmitter of the portable monitor 32 to determine its location. In certain of the embodiments, the stationary transceivers or receivers are coupled by cabling, while in others they are untethered.

Figure 9:
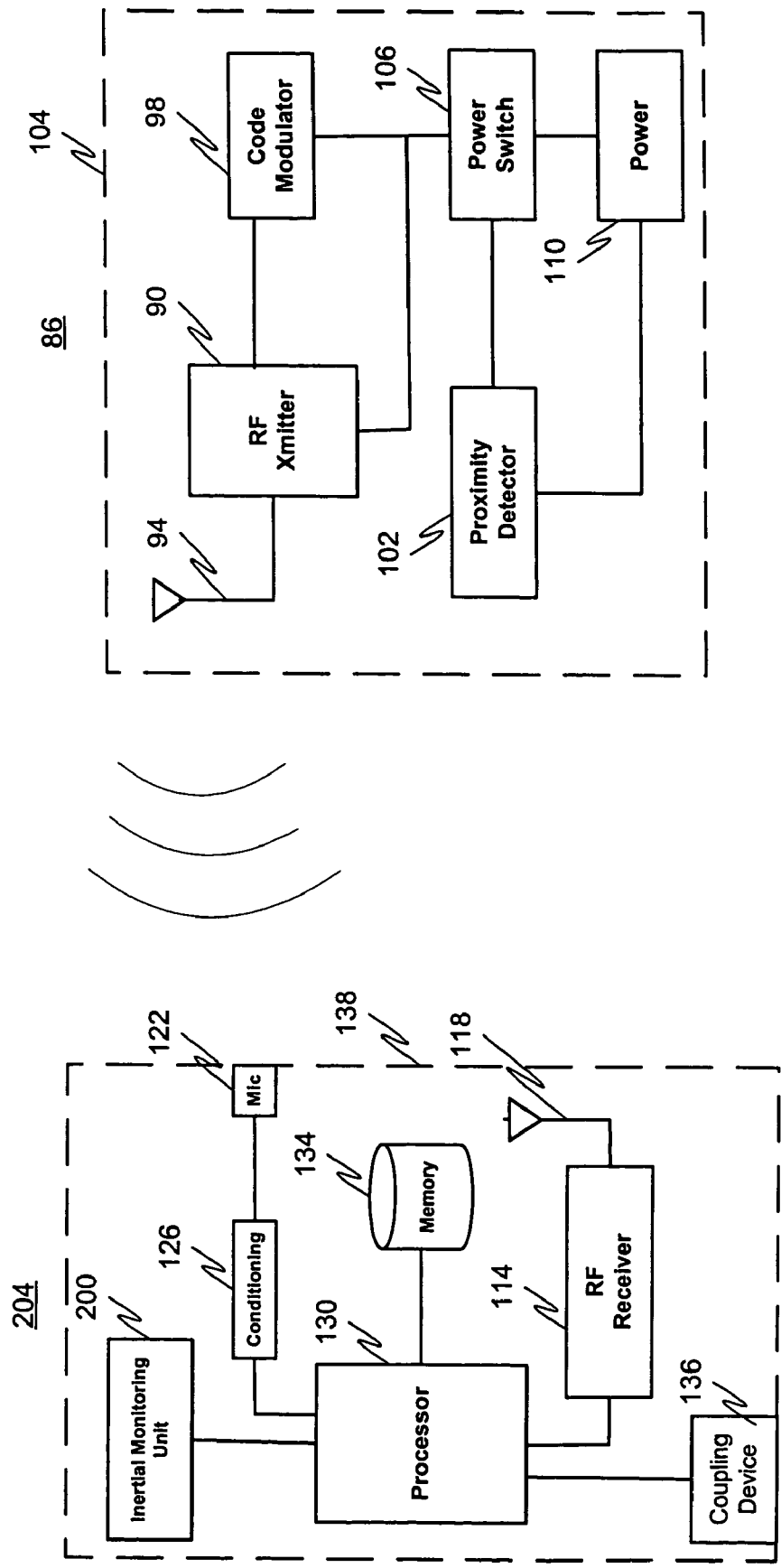
FIG. 9 provides block diagrams of certain embodiments of a location signal transmitter and portable monitor wherein the portable monitor tracks its location using an inertial monitoring device.

Referring now to FIG. 9, a system is illustrated in block form for measuring the exposure of a panelist to media data and media displays, as well as for monitoring the presence and movements of the panelist within a commercial establishment, in accordance with certain embodiments of the present invention. In FIG. 9, elements corresponding to those of FIG. 5 bear the same reference numerals. Similarly to the system shown in FIG. 5, the system of FIG. 9 includes a portable monitor 204 arranged to be carried on the person of a panelist. The portable monitor 204 receives one or more signals from one or more terrestrial sources and/or satellite sources, and generates data indicative of a location of the portable monitor 204. In certain embodiments, the signals used for this purpose are obtained from a cellular telephone system or from a GPS or assisted GPS receiver, as described above. However, in the system of FIG. 9, the location data is provided by an inertial monitoring device 200 which forms a part of portable monitor 204 and the received signals are used to provide location calibration data to the inertial monitoring device. Such calibration, which is described more fully below, may be performed periodically or from time to time, or whenever the signals from the terrestrial and/or satellite sources are received.

In the embodiment of FIG. 9 the inertial monitoring device 200 of the portable monitor 204 is calibrated by means of a signal transmitted by a calibration transmitter or transmitters 86 located in or in proximity to a commercial establishment in which the movements of the panelist wearing the monitor are to be tracked. Advantageously, in certain embodiments the calibration transmitter or transmitters are located by an entrance or exit of the establishment through which the panelist must pass to enter or leave the commercial establishment. The calibration signal is transmitted at sufficiently low power to ensure that it will be received only when the portable monitor is close by.

The inertial monitoring device preferably is small in size and lightweight. An advantageous embodiment of such an inertial monitoring device employs microelectromechanical sensors (MEMS) as either gyroscopic sensors and/or accelerometers to provide data from which the location of the monitor can be determined.

In certain embodiments to calibrate the inertial monitoring device 200 the portable monitor 204 employs satellite-based techniques, such as global positioning system (GPS) and/or server assisted GPS technology, and/or terrestrial techniques, such as an angle of arrival (AOA) technique, a time difference of arrival (TDOA) technique, an enhanced signal strength (ESS) technique, a location fingerprinting technique, and/or an ultra wideband location technique.

Although various embodiments of the present invention have been described with reference to a particular arrangement of parts, features and the like, these are not intended to exhaust all possible arrangements or features, and indeed many other embodiments, modifications and variations will be ascertainable to those of skill in the art.

What is claimed is:

1. A method for monitoring the presence and/or movements of participants in a market research study, comprising:
providing signal transmitters at predetermined locations within a commercial establishment to wirelessly transmit location signals associated with the locations, wherein the signal transmitters are adapted to not transmit the respective location signals when the presence of a participant is not detected;

providing a wireless receiver to each of a plurality of participants in the market research study, the wireless receiver being adapted to be carried on the person of one of the participants and operative to receive respective ones of the location signals only when in a vicinity of each of the locations;

gathering data in the wireless receiver representing exposure of respective ones of the participants to one of media data and outdoor advertising;

associating time data with each of the respective ones of the location signals corresponding to a time of reception thereof; and storing the received respective ones of the location signals and the associated time data within the wireless receiver for use in the market research study.

2. The method of claim 1, further comprising comparing time data and location signals to produce data representing movement of particular participants in the commercial establishment over time.

3. A system for monitoring the presence and/or movements of participants in a market research study, comprising:

a plurality of signal transmitters provided at predetermined locations within a commercial establishment to wirelessly transmit location signals associated with the locations, wherein the signal transmitters are adapted to not transmit the respective location signals when the presence of a person is not detected; and a plurality of monitors each adapted to be carried on the person of one of the participants in the market research study, wherein each of the monitors comprise:

a wireless receiver operative to receive respective ones of the location signals only when in a vicinity of each of the locations, a clock for producing time data associated with each of the respective ones of the location signals when received by the wireless receiver, and a memory coupled to the wireless receiver and to the clock for storing (a) data representing exposure of the participant to one of media data and outdoor advertising, and (b) the received respective ones of the location signals and the associated time data within the wireless receiver for extraction and use in the market research study.

4. The system of claim 3, further comprising a processor for processing the time data and the location signals to compare the time data and the location signals to produce data representing movement of particular participants in the commercial establishment over time.

5. A method of gathering data representing customer behavior in a commercial establishment, comprising:

providing a layout map representing a plurality of locations within a commercial establishment, wherein each location includes a signal transmitter for transmitting location signals associated with the locations, and wherein at least one of the signal transmitters is adapted to not transmit the respective location signals when the presence of a panelist is not detected;

providing a portable monitor to each of a plurality of panelists participating in a customer behavior study to be worn thereby;

gathering panelist presence data in the portable monitors representing a presence of respective ones of the panelists at identified ones of the locations within the commercial establishment, wherein the presence data further comprises data representing exposure of respective ones of the panelists to one of media data and outdoor advertising; and associating the panelist presence data with the plurality of locations represented by the layout map.

6. The method claim 5, wherein gathering data comprises receiving wirelessly transmitted location indicating data in the portable monitors representing ones of the locations within the commercial establishment.

7. The method of claim 5, comprising providing time data defining a time base within each of the portable monitors, and associating the time data with the panelist presence data received in the portable monitors.

8. The method of claim 7, comprising associating the time data with the media exposure data.

9. The method of claim 7, comprising and associating the time data with the outdoor advertising data.

10. The method of claim 5, wherein the media exposure data comprises data representing products offered for sale and/or displays of products offered for sale with selected ones of the plurality of locations represented by the layout map.

11. A method for monitoring activity of participants in a market research study, comprising:

providing a plurality of signal transmitters at respective locations within a commercial establishment, each of the signal transmitters operative to wirelessly transmit a respective location signal, wherein the signal transmitters are adapted to not transmit the respective location signals when the presence of a participant is not detected;

providing to each of a plurality of participants in the market research study a respective wireless receiver operative to receive respective ones of the location signals transmitted by the signal transmitters when the participants move throughout the commercial establishment;

gathering data in the wireless receiver representing exposure of respective ones of the participants to one of media data and outdoor advertising at the respective locations;

associating time data with each of the respective ones of the location signals corresponding to a time of reception thereof; and storing by the wireless receiver data representing the location signals received by the wireless receiver and associated time data for use in the market research study.

12. The method of claim 11, wherein providing a plurality of signal transmitters comprises providing the plurality of signal transmitters in respective vicinities of products offered for sale; and each of the wireless receivers is operative, when in the vicinity of one of the products offered for sale, to receive the location signal transmitted by the respective signal transmitter placed in the vicinity of said one of the products offered for sale.

13. The method of claim 11, comprising associating each of the signal transmitters with a respective product or advertisement; and wherein each of the transmitted location signals is adapted to be received by one of the wireless receivers only when said one of the wireless receivers is located in an area in which the product or advertisement associated with the signal transmitter transmitting the respective location signal can be perceived by the participant carrying said one of the wireless receivers.

14. The method of claim 11, comprising transmitting, by a selected one of the signal transmitting, commercial establishment data identifying the commercial establishment;

wherein each of the wireless receivers is operative to receive and store the transmitted commercial establishment data.

15. The method of claim 11, comprising disposing one of the signal transmitters in proximity to an entrance of the commercial establishment; and wherein each of the wireless receivers is operative to receive the location signal transmitted by said one of the signal transmitters only when the respective wireless receiver is disposed in proximity to the entrance of the commercial establishment.

16. The method of claim 11, further comprising downloading the data stored within each of the wireless receivers to a centralized processor utilizing respective base stations associated with the participants.

17. A system for monitoring activity of participants in a market research study, comprising:
a plurality of signal transmitters disposed at respective locations within a commercial establishment, each of the signal transmitters operative to wirelessly transmit a respective location signal only when the presence of a participant is detected by the signal transmitter;
a plurality of wireless receivers, each of the wireless receivers being carried by a respective one of a plurality of participants in the market research study and operative, when disposed in the commercial establishment, to receive respective ones of the location signals transmitted by the signal transmitters, gather respective ones of data representing exposure to one of media data and outdoor advertising, associating respective time data corresponding to a time of reception of the location signal in each wireless receiver and to store data representing the received location signals and associated time data.

18. The system of claim 17, wherein the signal transmitters are disposed in respective vicinities of products offered for sale within the commercial establishment; and each of the wireless receivers is operative, when in the vicinity of one of the products offered for sale, to receive the location signal transmitted by the respective signal transmitter disposed in the vicinity of said one of the products offered for sale.

19. The system of claim 17, wherein each of the signal transmitters is associated with a respective product or advertisement; and each of the transmitted location signals is adapted to be received by one of the wireless receivers only when said one of the wireless receivers is located in an area in which the product or advertisement associated with the signal transmitter transmitting the respective location signal can be perceived by the participant carrying said one of the wireless receivers.

20. The system of claim 17, wherein at least one of the signal transmitters is operative to transmit commercial establishment data identifying the commercial establishment; and each of the wireless receivers is operative to receive and store the transmitted commercial establishment data.

21. The system of claim 17, wherein one of the signal transmitters is disposed in proximity to an entrance of the commercial establishment; and
wherein each of the wireless receivers is operative to receive the location signal transmitted by said one of the signal transmitters only when the respective wireless receiver is disposed in proximity to the entrance of the commercial establishment.

22. The system of claim 17, further comprising a plurality of base stations, each of the base stations associated with a respective one of the participants of the market research study and operative to download the data stored within the respective wireless receiver to a centralized processor.

23. A method for monitoring activity of participants in a market research study, comprising:
providing a plurality of signal transmitters on or within proximity to respective products or advertisements related to a commercial establishment, each of the signal transmitters operative to wirelessly transmit (a) a respective transmitter ID signal associated with a respective one of said products or advertisements, and (b) a location signal associated with the respective location of the product or advertisement, wherein the location signal is not transmitted if the presence of a participant is not detected;
providing to each of a plurality of participants in the market research study a respective wireless receiver operative to receive a transmitter ID signal and location signal transmitted by one of the signal transmitters when in proximity to said one of the signal transmitters, wherein the wireless receiver gathers data representing exposure to one of media data and outdoor advertising representing respective products or advertisements, and wherein the wireless receiver associates time data with each of the location signals corresponding to a time of reception of a respective one of the location signal and ID signal; and
storing by the wireless receiver data representing each of the transmitter ID signals, location signals and time data received by the wireless receiver.

24. The method of claim 23, wherein the respective transmitter ID signal of each of the signal transmitters is associated only with the respective one of said products or advertisements.

25. The method of claim 23, wherein at least one of the signal transmitters is operative to wirelessly transmit the respective transmitter ID signal as an inaudible code disposed within an acoustic signal; and each of the wireless receivers is operative to receive the acoustic signal and extract the inaudible code disposed therein.

26. The method of claim 23, comprising providing each of the wireless receivers with a GPS receiver operative to receive GPS signals and to identify a location of the wireless receiver based on the received GPS signals; each of the wireless receivers operative to store the location of the respective wireless receiver along with the transmitter ID signals received by the respective wireless receiver.

27. A method of gathering market research data in a portable monitor carried by a panelist in a market research study, comprising the steps of:
receiving location signals from a plurality of signal transmitters associated with specific locations within a commercial establishment, wherein a respective location signal will not be received from the transmitter if the portable monitor's presence, in the vicinity of the respective location, is not detected by the transmitter;
associating time data with the respectively received location signal corresponding to a time of reception thereof from a respective signal transmitter;
producing presence data within the portable monitor indicating presence of a panelist at the specific locations; and
producing one of media data exposure data and outdoor advertising exposure data using the presence data and associated time data within the portable monitor for use in the market research study.

28. The method of claim 27, comprising calibrating an inertial monitoring unit within the portable monitor based on the respectively received location signal and determining a presence at a plurality of locations within the commercial establishment by means of the calibrated inertial monitoring unit.

29. The method of claim 27, wherein the step of producing presence data comprises producing data based on the received wirelessly transmitted location signal by means of one of (a) an angle of arrival technique, (b) a time difference of arrival technique, (c) enhanced signal strength technique, (d) a location fingerprinting technique and (e) an ultra wide band location technique.

30. The method of claim 27, wherein the step of producing media data exposure is based on acoustic media data received by the portable monitor.

* * * * *